United States Patent
Simon et al.

(10) Patent No.: US 9,472,075 B1
(45) Date of Patent: Oct. 18, 2016

(54) SYSTEMS AND METHODS FOR LOCATING ITEMS IN A FACILITY

(71) Applicants: Pierre-Michel G. Simon, Gradignan (FR); Michael Sansur, Modjeska, CA (US)

(72) Inventors: Pierre-Michel G. Simon, Gradignan (FR); Michael Sansur, Modjeska, CA (US)

(73) Assignee: Tyco Fire & Security GmbH, Neuhausen Rheinfall (CH)

( * ) Notice: Subject to any disclaimer, the term of this patent is extended or adjusted under 35 U.S.C. 154(b) by 0 days.

(21) Appl. No.: 14/730,429

(22) Filed: Jun. 4, 2015

(51) Int. Cl.
| | |
|---|---|
| G08B 13/14 | (2006.01) |
| G08B 13/24 | (2006.01) |
| G06K 7/00 | (2006.01) |
| G06K 19/07 | (2006.01) |
| G06Q 10/08 | (2012.01) |
| G06K 19/077 | (2006.01) |

(52) U.S. Cl.
CPC ......... G08B 13/2462 (2013.01); G06K 7/0008 (2013.01); G06K 19/0723 (2013.01); G06K 19/07749 (2013.01); G06Q 10/087 (2013.01)

(58) Field of Classification Search
None
See application file for complete search history.

(56) References Cited

U.S. PATENT DOCUMENTS

| | | | |
|---|---|---|---|
| 6,249,252 B1 | 6/2001 | Dupray | |
| 6,529,164 B1 | 3/2003 | Carter | |
| 7,151,979 B2 | 12/2006 | Andersen et al. | |
| 7,170,412 B2 | 1/2007 | Knox et al. | |
| 7,312,752 B2 | 12/2007 | Smith et al. | |
| 7,456,726 B2 | 11/2008 | Hansen et al. | |
| 7,619,524 B2 | 11/2009 | Calvarese | |
| 7,667,575 B2 | 2/2010 | Husak et al. | |
| 7,772,976 B2 | 8/2010 | Christopher | |
| 8,002,181 B2 | 8/2011 | Ulrich et al. | |
| 8,072,311 B2 | 12/2011 | Sadr et al. | |

(Continued)

FOREIGN PATENT DOCUMENTS

| | | |
|---|---|---|
| CN | 102043149 A | 5/2011 |
| CN | 103279780 A | 9/2013 |

(Continued)

OTHER PUBLICATIONS

Wang, J. and Katabi, D., Dude, Wehre's My Card? RFID Positioning That Works with Multipath and Non-Line of Sight, Proceedings of the ACM SIGNCOMM 2013 conference, vol. 43, Issue 4, Oct. 2013, 51-62.

(Continued)

*Primary Examiner* — Ojiako Nwugo
(74) *Attorney, Agent, or Firm* — Fox Rothschild LLP; Robert J. Sacco; Carol E. Thorstad-Forsyth

(57) ABSTRACT

Systems (100) and methods (400) for determining a location of an object within a facility. The methods involve: performing operations by beacons to illuminate a plurality of Zone-Of-Interests ("ZOIs") including objects within the facility; performing operations by a handheld reader to read RFID tags coupled to the objects; performing operations by a beacon receiver to obtain a first location identifier transmitted from a first beacon while the handheld reader is reading the RFID tags; using the first location identifier to determine approximate locations of the RFID tags which were read in time proximity to the beacon receiver's reception of the location identifier; and optionally generating a three dimensional map showing locations of the RFID tags. Notably, the beacon receiver is an accessory of the handheld receiver or a standalone device worn by an operator of the handheld device.

20 Claims, 5 Drawing Sheets

(56) References Cited

U.S. PATENT DOCUMENTS

| | | | |
|---|---|---|---|
| 8,237,563 | B2 | 8/2012 | Schatz et al. |
| 8,427,281 | B2 | 4/2013 | Tsujimoto et al. |
| 8,459,540 | B2 | 6/2013 | Brindley et al. |
| 8,519,848 | B2 | 8/2013 | Stern |
| 8,629,773 | B2 | 1/2014 | Rhie et al. |
| 8,660,581 | B2 | 2/2014 | Davis et al. |
| 8,738,175 | B2 | 5/2014 | Cameron et al. |
| 9,195,866 | B1 | 11/2015 | Mehranfar et al. |
| 2004/0246926 | A1 | 12/2004 | Belcea et al. |
| 2005/0023036 | A1 | 2/2005 | Cole et al. |
| 2005/0083181 | A1 | 4/2005 | Jalkanen et al. |
| 2006/0071790 | A1 | 4/2006 | Duron et al. |
| 2006/0267731 | A1 | 11/2006 | Chen |
| 2008/0055088 | A1* | 3/2008 | Fabre .................. B65G 1/1371 340/572.1 |
| 2008/0284593 | A1 | 11/2008 | Soto et al. |
| 2009/0101712 | A1 | 4/2009 | Ulrich et al. |
| 2010/0007495 | A1 | 1/2010 | Hanebeck |
| 2010/0033306 | A1 | 2/2010 | Bellows et al. |
| 2010/0066503 | A1 | 3/2010 | Rhie et al. |
| 2010/0201520 | A1 | 8/2010 | Stern et al. |
| 2011/0121075 | A1* | 5/2011 | Bellows ............... G06K 7/0004 235/440 |
| 2011/0309931 | A1 | 12/2011 | Rose |
| 2012/0133488 | A1* | 5/2012 | Choi .................. G06K 7/10079 340/10.1 |
| 2012/0268250 | A1 | 10/2012 | Kaufman et al. |
| 2013/0030931 | A1 | 1/2013 | Moshfeghi |
| 2013/0169415 | A1 | 7/2013 | Bellows et al. |
| 2013/0249736 | A1 | 9/2013 | Nikitin et al. |
| 2014/0084060 | A1 | 3/2014 | Jain et al. |
| 2014/0124570 | A1 | 5/2014 | Franklin |
| 2014/0148196 | A1 | 5/2014 | Bassan-Eskenazi et al. |
| 2014/0167918 | A1 | 6/2014 | Stern et al. |
| 2014/0306808 | A1 | 10/2014 | Jones et al. |
| 2014/0375454 | A1 | 12/2014 | Konrad et al. |
| 2015/0077245 | A1 | 3/2015 | Kaufman et al. |

FOREIGN PATENT DOCUMENTS

| | | |
|---|---|---|
| JP | 2010226273 A | 10/2010 |
| KR | 20110098487 A | 9/2011 |
| WO | 01/44082 A2 | 6/2001 |

OTHER PUBLICATIONS

Nemmaluri, Aditya et al., Sherlock: Automatically Locating Objects for Humans, Proceedings of the 6th International Conference on Mobile Systems, Applications, and Services, 2008, 187-198.

PCT International Search Report and Written Opinion of the International Searching Authority (EPO) for International Application No. PCT/US2016/035822 (dated Aug. 22, 2016).

\* cited by examiner

SYSTEMS AND METHODS FOR LOCATING ITEMS IN A FACILITY

FIELD OF THE INVENTION

This document relates generally to wireless based systems. More particularly, this document relates to systems and methods for locating tags within a facility using various technologies (e.g., Radio Frequency Identifier ("RFID") technology, optical technology, Wi-Fi technology, Bluetooth technology, proximity sensor technology, gyroscope technology, accelerometer technology and/or magnetometer technology).

BACKGROUND OF THE INVENTION

RFID technology has conventionally been used in the identification and tracking of products, equipment, and even people. For example, RFID systems are commonly used in Electronic Article Surveillance ("EAS") and in logistical and inventory systems for monitoring goods and equipment and recording information on the target item. An RFID system typically includes an RFID reader and an RFID device such as a tag or label. The RFID reader may transmit a Radio-Frequency ("RF") carrier signal to the RFID device. The RFID device may respond to the RF carrier signal (or interrogator signal) with a data response signal (or authentication reply signal) encoded with information stored on the RFID device. RFID devices may store information such as a unique identifier or an Electronic Product Code ("EPC") associated with an article or item.

The RFID technology allows retailers to rapidly and/or continuously identify products, count products and track product locations. As such, the RFID technology offers significant benefits over a physical inventory counting process. By leveraging the RFID technology to increase inventory accuracy, retailers are better able to perform replenishment, service customer requests, manage product recalls or any other activities that rely on inventory data. With this level of inventory visibility, retailers must also take on the additional burden of being able to locate specific products easily and quickly so that they can service the above-listed use cases. Products on the market today to aid in determining a product's location are either too expensive or not accurate enough to serve this need.

Indoor proximity systems are well known in the art. One conventional indoor proximity system is known as iBeacon®. iBeacon® employs Bluetooth communication technology to connect to mobile communication devices (e.g., cellular phones). Upon establishment of such connection, the iBeacon® requests and receives first information from each Mobile Communication Device ("MCD"). The first information includes information which has been agreed upon by the cell user for provision to the iBeacon®. The iBeacon® can also push second information to the MCD. The Bluetooth communication technology is based on a 2.45 GHz transmission, and its data rate ranges from 1 Mbit to 24 Mbit.

SUMMARY OF THE INVENTION

The present disclosure concerns implementing systems and methods for determining a location of an object within a facility. The methods involve: performing operations by a plurality of beacons to respectively illuminate a plurality of Zone-Of-Interests ("ZOIs") including objects to be inventoried or located within the facility; performing operations by a handheld reader to read a plurality of RFID tags coupled to the objects located within at least one of the plurality of ZOIs; performing operations by a beacon receiver to obtain a first location identifier transmitted from a first beacon of the plurality of beacons while the handheld reader is reading the plurality of RFID tags; using the first location identifier to determine approximate locations of the plurality of RFID tags which were read in time proximity to the beacon receiver's reception of the location identifier; and optionally generating a three dimensional map showing locations of the RFID tags. Notably, the beacon receiver is an accessory of the handheld receiver or a standalone device worn by an operator of the handheld device. In both cases, the beacon receiver communicates that first location identifier to the handheld reader or an external processing unit via a wireless communication (e.g., a Bluetooth communication or Wi-Fi link).

In some scenarios, the methods also involve: detecting when the handheld reader is within a ZOI of the plurality of ZOIs, near an object, or near an obstacle; and automatically transitioning a mode of the handheld reader from a default mode in which the handheld reader performs tag reads at high power to a location mode in which the handheld reader toggles between tag reads at high power and tag reads at low power. A power level of the handheld reader may be adjusted based on a density of RFID tags being read. Additionally or alternatively, a beacon receiver's detector is aligned with a beacon's emitter based on sensor data generated by inertial sensors located internal to the beacon receiver.

In those or other scenarios, the methods further involve: detecting depression of a trigger of a handheld reader being carried through the facility by an operator; and performing operations by the handheld reader to cause the beacon receiver to communicate with at least the first beacon of the plurality of beacons, in response to the depression of the trigger.

The handheld reader may also perform operations to read locator tags while reading the plurality of RFID tags. In this case, the locator tag's known location is assigned to each of the plurality of RFID tags.

In yet other scenarios, two or more ZOIs overlap which causes cross-reads to occur. Accordingly, the beacon receiver would obtain a second location identifier transmitted from a second beacon of the plurality of beacons while the handheld reader is reading the plurality of RFID tags. A location confidence value is then computed for each of the first and second location identifiers and for each of the plurality of RFID tags. The location confidence values are used to deduce the approximate locations of the plurality of RFID tags.

DESCRIPTION OF THE DRAWINGS

Embodiments will be described with reference to the following drawing figures, in which like numerals represent like items throughout the figures, and in which.

DETAILED DESCRIPTION OF THE INVENTION

Figure 1:
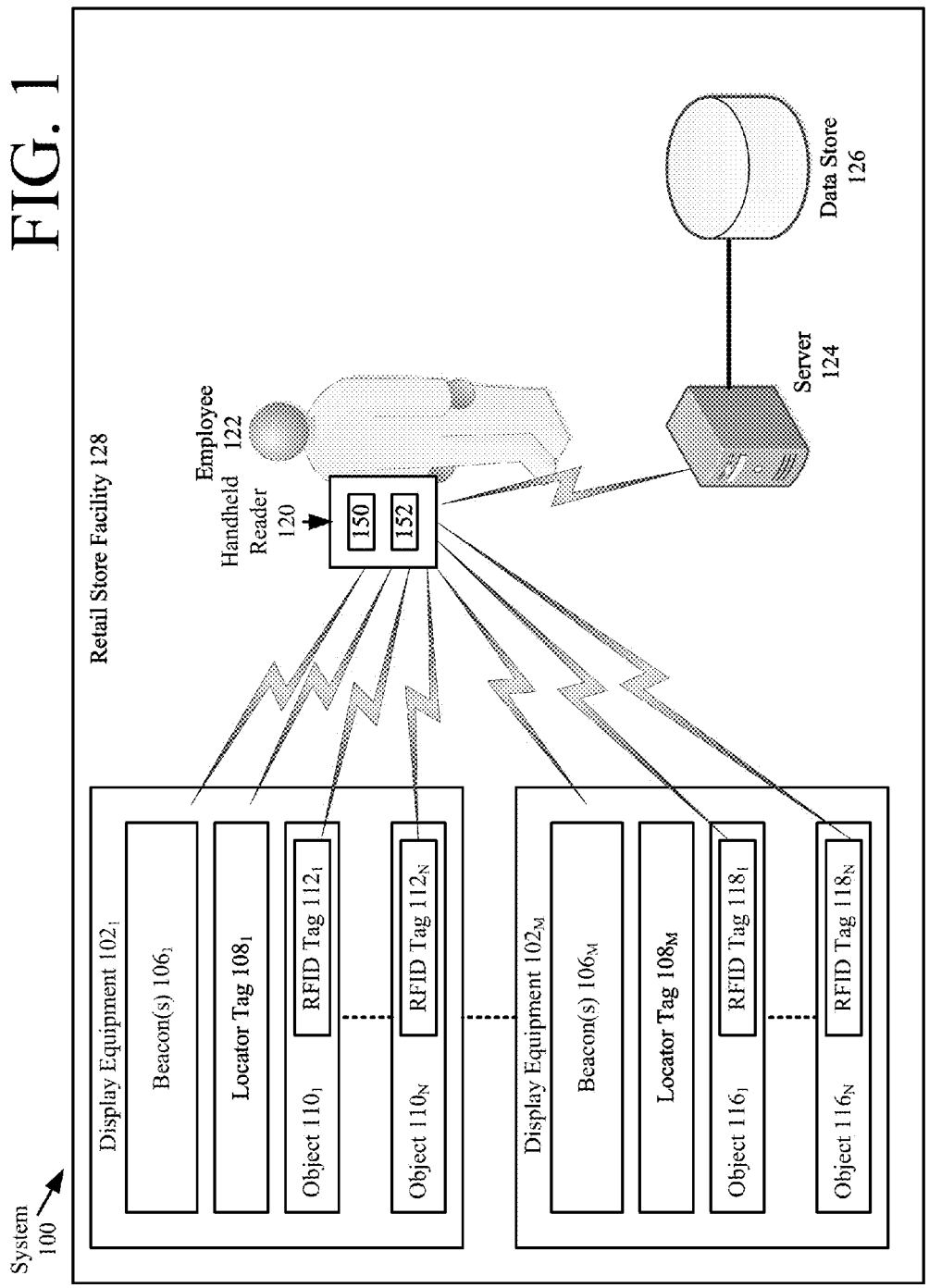
FIG. 1 is a schematic illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure concerns systems and methods for locating objects or items (e.g., tags) within a facility using one or more different types of technology (e.g., Radio Frequency Identifier ("RFID") technology, infrared technology, proximity sensor technology, gyroscope technology, accelerometer technology and/or magnetometer technology). In some scenarios, beacons are strategically placed at certain locations (e.g., on walls, ceiling, shelves or other display equipment) within the facility. The beacons provide a means to determine locations of the objects or items within the facility (e.g., RFID tags). The solution enables the location of the objects or items using existing RFID readers equipped with an additional accessory (e.g., a beacon receiver). The solution preserves inventory time and accuracy with no additional staff training and minimal infrastructure.

For example, stationary tags (that are read by a mobile RFID reader) are considered as being located within the facility. However, this knowledge does not provide an accurate enough location of the fixed tags for certain applications. As such, additional operations are performed to increase the accuracy of the fixed tag's locations. Therefore once these relatively inaccurate locations of the fixed tags are obtained, additional information can be used to obtain a more accurate determination of the fixed tags' locations within the facility. Also, operations are performed to determine an accurate location of the handheld reader while it is being used to read the fixed tags. In this regard, a user can perform a user-software interaction via a GUI of the handheld reader for indicating (her)his location within the facility. Thereafter, a three dimensional map is generated and presented to the user showing the location of the handheld reader and/or the locations of the fixed tags relative to the handheld reader in three dimensional space.

This location information is useful for many purposes. For example, the location information can be used to microlocate items during an inventory process. Knowing accurate locations of items within a facility would be a tremendous feature for warehouse, retailer, hospitals and other applications where tracking items is needed.

The basic idea of this disclosure can be easily understood in a small retail store context. Let's assume that eight fixed beacons are placed around the walls of the retail store at known locations. Alternatively or additionally, fixed tags (e.g., locator tags) are placed around the retail store. In the beacon scenarios, each beacon transmits a unique identifier and has a known directional emission pattern. A beacon receiver reads the identifiers of the fixed beacons while also reading tags coupled to items. The beacon receiver can be worn by a person or carried by the person as an accessory of a handheld reader. The tags that are read by the beacon receiver are considered as being located in the ZOI of one of the fixed beacons for which a unique identifier has been received by the handheld reader (or an accessory of the handheld reader) and if existing in the vicinity of the fixed tag read in close time proximity.

The orientation of the beacon receiver can also be determined based on sensor data generated by sensors (e.g., gyroscopes, accelerometers and/or magnetometers) internal to the beacon receiver. The orientation can then be used to align the beacon receiver's optical detector with the beacon's optical emitter.

Notably, the more RFID tags read by the handheld reader, the more information is obtained to determine how far the handheld reader is from a fixed beacon and/or tag. The handheld reader can vary its RFID read power and use an averaging technique to improve its location determinations. Once the RFID tag's locations have been determined, the three dimensional map can be updated to show the same.

Exemplary Systems

Referring now to FIG. 1, there is provided a schematic illustration of an exemplary system 100 that is useful for understanding the present invention. The present invention is described herein in relation to a retail store environment. The present invention is not limited in this regard, and can be used in other environments. For example, the present invention can be used in distribution centers, factories and other commercial environments. Notably, the present invention can be employed in any environment in which objects and/or items need to be located and/or tracked.

The system 100 is generally configured to allow improved object and/or item locating within a facility using various types of communication and sensor technologies. As shown in FIG. 1, system 100 comprises a Retail Store Facility ("RSF") 128 in which display equipment 104, 106 is disposed. The display equipment is provided for displaying objects (or items) $110_1$-$110_N$, $116_1$-$116_N$ to customers of the retail store. The display equipment can include, but is not limited to, shelves, article display cabinets, promotional displays, fixtures and/or equipment securing areas of the RSF 128. The RSF can also include emergency equipment (not shown), checkout counters and an EAS system (not shown). Emergency equipment, checkout counters, and EAS systems are well known in the art, and therefore will not be described herein.

Beacons $106_1, \ldots, 106_M$ are located at strategic locations within the RSF 128. In some scenarios, the beacons are disposed on display equipment $102_1, \ldots, 102_M$, as shown in FIG. 1. Additionally or alternatively, the beacons are disposed on emergency equipment, checkout counters, walls, ceilings, and/or EAS system equipment (e.g., pedestals near and entrance/exit of the RSF). Beacons are well known in the art, and therefore will not be described herein. Still, it should be understood that the beacons are generally configured to facilitate a periodic or continuous determination of locations of the objects within the RSF 128.

The beacons $106_1, \ldots, 106_M$ rely on highly directional signals (such as optical signals) in order to illuminate a well-defined zone (e.g., a shelf). Accordingly, the beacons can include, but are not limited to, infrared beacons, ultrasonic beacons, and RF beacons. The RF beacons can employ an 802.11 protocol, an 802.15.4 protocol or Bluetooth technology.

The beacons $106_1, \ldots, 106_M$ are positioned so that beams are emitted toward locations where items are stored (e.g., shelves). For example, the beacons may be mounted overhead emitting downward to limit operator body shielding and avoid blocking obstacles. In some scenarios, the beacons would not emit vertically but with certain angles. The coverage of a beacon is the field in which the beacon receiver is able to receive and decode the beacon signals. This field is called the "Zone-Of-Interest" or "ZOI". The locations of the ZOIs are known. Each ZOI is identified by the location Identifier ("ID") transmitted from a respective beacon. The beacons can be arranged so that their ZOIs do or do not overlap. Overlapping ZOIs provide a means to compensate shadowing from an operator body or obstacles.

Each ZOI contains the items to be inventoried and located. The size of the ZOI depends on the location accuracy. In some exemplary cases, the ZOI is less than a one (1) meter radius. The RSF 128 has a plurality of ZOIs. A single ZOI could encompass a single shelf, rack or table. The present invention is not limited to the particulars of this example.

By correlating RFID tag reads and the location ID received from the beacon, it is possible to determine the location of objects $110_1, \ldots, 110_N, 116_1, \ldots, 116_N$ within the RSF 128. In this regard, it should be understood that information is stored in a data store 126 that specifies the known locations of the beacons in three dimensional space. This information can be stored in the data store 126 using a server 124. Server 124 will be described in more detail below in relation to FIG. 2.

The beacons $106_1, \ldots, 106_M$ are designed to be inexpensive, light, small, autonomous, easy to mount, long lasting and energy efficient. In this regard, the beacons may comprise an energy harvesting circuit. The energy harvesting circuit can include, but is not limited to, a solar cell array, a rechargeable battery, a super capacitor and/or a voltage converter.

A beacon receiver 150 is provided for communicating with the beacons $106_1, \ldots, 106_M$. In this regard, the beacon receiver 150 is designed to receive beacon signals from the beacons when placed with the ZOIs, respectively. The beacon receiver 150 may be provided as an accessory to a handheld reader 120, or alternatively worn by an operator of the handheld reader 120 to optimize reception and to avoid the obstruction of beacon signals by the operator's body. The shoulders, head or arms of the operator are relatively good placements to receive highly directional signals from the beacons $106_1, \ldots, 106_M$.

The beacon receiver 150 may use broad and/or multiple sensors pointing at different directions to maximize reception and compensate the operator's movement and motion. The beacon receiver 150 could use the fusion of inertial sensors (e.g., a gyroscope, an accelerometer and/or a magnetometer) to identify the spatial position of the beacon receiver, and therefore the direction of the inertial sensor. In some scenarios, only location IDs received from the sensor pointing up is used. In this case, the inertial sensors are used to determine which sensor is pointing up and therefore which sensor to listen.

Notably, locator tags $108_1, \ldots, 108_M$ may be employed in addition to or as an alternative to the beacons $106_1, \ldots, 106_M$. Each locator tag has a unique ID associated therewith. When the handheld reader 120 reads a locator tag, it obtains the unique ID. Information is stored in database 126 which specifies the known locations of the locator tags. Accordingly, RFID tags $112_1, \ldots, 112_N$ read in time proximity with a locator tag can be assigned to the approximate same location (e.g., a particular shelf, table or other piece of display equipment).

As noted above, the handheld reader 120 is generally configured to read RFID tags $112_1, \ldots, 112_N, 118_1, \ldots, 118_N$ and the locator tags $108_1, \ldots, 108_M$. The RFID tags $112_1$-$112_N$, $118_1$-$118_N$ are respectively coupled to the objects $110_1$-$110_N$, $116_1$-$116_N$. The RFID and locator tags are described herein as comprising single-technology tags that are only RFID enabled. The present invention is not limited in this regard. The RFID and locator tags can alternatively or additionally comprise dual-technology tags that have both EAS and RFID capabilities.

In some scenarios, the handheld reader 120 operates in a static configuration. The operator sets the power and other RFID parameters before reading tags to inventorying the same. The whole inventory of tags is performed with the configuration set at the start of the inventorying process.

In other scenarios, the handheld reader 120 operates in a dynamic configuration. The handheld reader 120 dynamically adapts its parameters based on whether or not it is present within a ZOI. When the handheld reader 120 is not present within a ZOI, the handheld reader 120 operates in a default mode, i.e., using a maximum power and reading RFID tags only once to ensure inventory accuracy in a timely manner. When the handheld reader 120 is within a ZOI, the handheld reader 120 operates in a location mode, i.e., it toggles between reads at high power and reads at low power. The power used to read an RFID tag is inversely proportional to a tag location confidence factor. That is, the lower the power used to read an RFID tag, the higher the tag location confidence. High power reads ensure inventory accuracy, while low power reads allow location accuracy. In location mode, an RFID tag can be read multiple times to allow the correlation logic to re-allocate an RFID tag from one location to another. The power can be dynamically adjusted depending on the RFID tag density being read. As inventory accuracy has to be maintained, the power applied in location mode can be reduced in case of dense tag population, and vice versa.

During operation of system 100, RFID tag location is performed by allocating a ZOI to each RFID tag. The ZOI is identified by the location ID received from a beacon when the RFID tags' are being read by the handheld reader 120. As the beacon position is known and associated with a unique location ID, the physical location of the RFID tag is deduced and located as being within the ZOI of the beacon.

Notably, the location ID is not constantly received while the beacon receiver is in the ZOI. Accordingly, the mode of the handheld reader is maintained for a certain period of time ("latch time") and renewed each time a location ID is received. The latch time does not exceed a few seconds as the operator can physically move from one ZOI to another ZOI within a few seconds. For each location ID received, a time window is defined in which occurred tag reads are associated with the location.

In some scenarios, two or more ZOIs overlap or RFID tags may be read frm an adjacent ZOI, which causes cross-reads to occur. A cross-read is a tag read from a first ZOI to a second ZOI. Cross-reads cause location conflicts and may reduce location accuracy. In order to resolve location conflicts, a location confidence is computed for each location ID and for each tag involved. The location confidence is computed based on the number of reads, an average Received Signal Strength Indicator ("RSSI"), a max RSSI and the handheld reader's power level at the time of a tag read. The tag location is deducted from the location ID having the highest location confidence value. An RFID tag can be declared between multiple locations if there is no clear winner based on the location confidences.

In other scenarios, simple logic is employed to determine tag locations. For example, the handheld reader records a time window centered on a timestamp of each location ID received. Then for each RFID tag, the timestamp of the read having the highest RSSI is used to retrieve the associated location ID if it is included in a recorded time window. The location is deduced from the location ID.

In some scenarios, one or more locator tags $108_1, \ldots, 108_M$ are placed within each beacon's ZOI for improving location accuracy by providing additional location data. For example, a locator tag is placed on each side of a table or shelf. Alternatively or additionally, a locator tag is placed on each shelf of multi-shelf display equipment. A locator tag can include, but is not limited to, an RFID tag mounted on a wall, ceiling, ground or equipment for which a location is known. The locator tag is oriented to be easily read.

An RFID tag $112_1, \ldots, 112_N$ may be used as a locator tag if its determined location is considered as having a high degree of confidence. In this scenario, the locator tag reads adjust the location confidence for each RFID tag read in close time proximity. Tag reads around the same time as a locator tag have a higher probability to be in the same ZOI as the locator tag. The locator tag reads are also used to provide approximate positions within the ZOI reducing the location granularity. The locator tag reads also help to approximate the height of the surrounding RFID tags enabling three dimensional mapping.

The tag location in regards to locator tags is performed when both tags have been read at a relatively lower power (short range). Since the usage of low power reduces the inventory accuracy and/or slows down the process, it should be performed only when necessary. The handheld reader 120 will operate in default mode most of the time (i.e., read using a relatively high power), and operate in location mode only when close to objects (i.e., read using a relatively low power). The location mode is triggered when a locator tag is read along a relatively high RSSI. The location mode is maintained for a certain period of time. The time period is renewed when a reader trigger event reoccurs. A low power read on a locator tag is also an event renewing the location mode period.

The location mode can also be triggered by detecting the proximity of items or obstacles. In this case, the handheld reader is equipped with a proximity sensor 152 (e.g., an acoustic sensor or infrared sensor). The proximity sensor 152 detects the distance from the handheld reader to the RFID tags being read. A distance threshold value can be applied to trigger the location mode. The distance can be used to adjust the read power of the handheld reader. The distance can be used to compute more precise tag locations.

The tag locations are achieved by considering tag reads in close time proximity with a locator tag read as approximately in the same location. The lower the read power used, the higher the tag location confidence. The location confidence is computed based on the number of reads, an average RSSI, a maximum RSSI and the handheld reader's power level used to read the RFID tags. An RFID tag's location is deduced from the locator tag position having clearly the higher location confidence value. An RFID tag can be declared between multiple locations if there is no clear winner based on the location confidences.

Alternatively, a different logic is employed that consists of recoding a time window centered on the timestamp of each locator tag read. All those time windows chronologically aligned create a timeline of the handheld reader's location as each time window corresponds to a tag locator for which its location is known.

For each RFID tag, the read having the highest RSSI is selected and the timestamp of this read is used with the timeline. If the timestamp is included in a recorded time window of the timeline, the location is deduced from the location of the corresponding locator tag.

When two time windows overlap, the one created from the read having the highest RSSI takes over the overlapping time period. The applied time window widths can be adjusted based on the RSSI locator tag reads. The higher the RSSI, the wider the time window and vice versa. As a result, a tag locator read having higher RSSI takes priority while a tag locator read occurring at lower RSSI would have their time window reduced or filtered.

The ZOI coverage and locator tag positions have to be known to enable tag location. This mapping can be done by taking physical measurements. Additionally or alternatively, a fingerprint technique is employed. Using the handheld reader 120 with a touch screen, a user records received location IDs while pinpointing (his)her position on a map displayed on the touch screen. By doing so, the ZOIs are mapped to physical locations and maintained in a database. The same process can be applied to locator tags. A user scans a locator tag while pinpointing (her)his location on the map. The scanning can be done by: reading a two dimensional barcode printed on a locator tag; and/or RFID reads at very close range to the locator tag.

The field emitted by a beacon $106_1, \ldots, 106_M$ could be shaped in order to guarantee that its emitting signals cover the corresponding ZOI. Beacons may contain a control system allowing the beacon receiver to remotely change the beacon beam width and range. The beacon receiver would provide a feedback to the operator (visual, audible or vibration) indicating the receiving of location ID. Using the feedback and the beam width/power remote control, the operator can adjust the beacon to confine the field to the corresponding ZOI. This operation may be performed once during installation. As the beams are highly directional, the beacon 150 receiver would only receive signals from the beacon pointing to its location whatever its position in space.

A more complex implementation could use multiple beacons emitting in multiple directions from various placements (e.g., ceilings, walls, furniture, etc.). The beacon receiver receives multiple unique location IDs from multiple beacons at a time. Knowing the coverage of each beacon, a geometric computation is performed to deduce the beacon receiver's position in space. The position can also be retrieved from a database previously populated by a site survey (beacons fingerprint). The combination of location IDs is the key to access the location entry of the database. Knowing the beacon receiver's position in space, the location mode of the handheld reader 120 could be applied if detected nearby item storage. The item locations are deduced from the handheld reader's position at the time reads occurred. Additionally, a beacon receiver equipped with directional sensors pointing in various directions can deduce its approximate position in space (roll, pitch and yaw) and location as it would receive specific location IDs from specific sensors at specific positions. A sampling of those position and location combinations can be stored in database using the fingerprint method and retrieved later.

Figure 2:
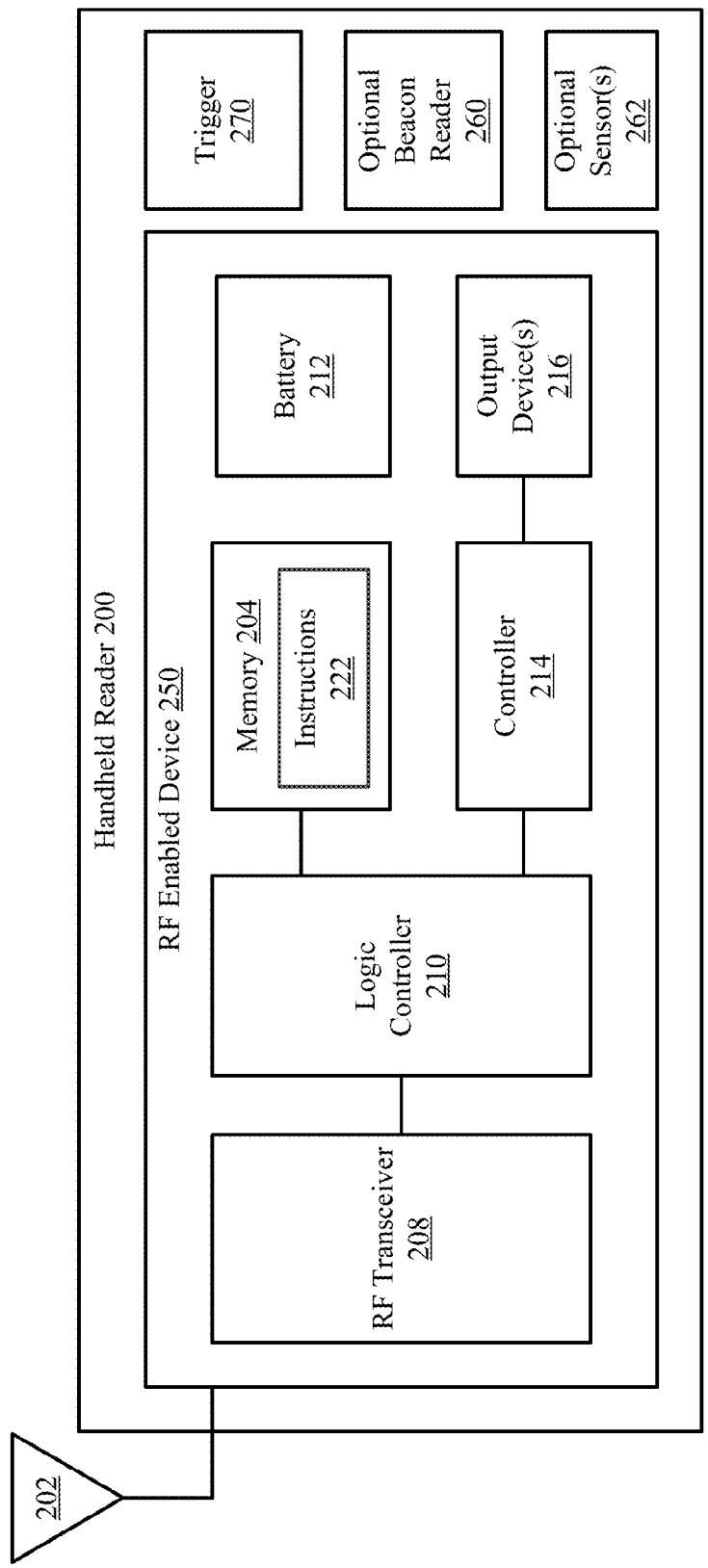
FIG. 2 is a block diagram of an exemplary architecture for a handheld reader.

Referring now to FIG. 2, there is provided a detailed block diagram of an exemplary architecture for a handheld reader 200. Handheld reader 120 of FIG. 1 is the same as or similar to handheld reader 200. As such, the discussion of handheld reader 200 is sufficient for understanding handheld reader 120.

Handheld reader 200 may include more or less components that that shown in FIG. 2. However, the components shown are sufficient to disclose an illustrative embodiment implementing the present invention. Some or all of the components of the handheld reader 200 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 2 represents an embodiment of a representative handheld reader 200 configured to facilitate improved object locating within an RSF (e.g., RSF 128 of FIG. 1). In this regard, the handheld reader 200 comprises an RF enabled device 250 for allowing data to be exchanged with an external device (e.g., locator tags $108_1, \ldots, 108_M$, and/or RFID tags $112_1, \ldots, 112_N$, $118_1, \ldots, 118_N$ of FIG. 1) via RF technology. The components 204-216 shown in FIG. 2 may be collectively referred to herein as the RF enabled device 250, and include a power source 212 (e.g., a battery).

The RF enabled device 250 comprises an antenna 202 for allowing data to be exchanged with the external device via RF technology (e.g., RFID technology or other RF based technology). The external device may comprise locator tags $108_1, \ldots, 108_M$, and/or RFID tags $112_1, \ldots, 112_N$, $118_1, \ldots, 118_N$ of FIG. 1. In this case, the antenna 202 is configured to transmit RF carrier signals (e.g., interrogation signals) to the listed external devices, and/or transmit data response signals (e.g., authentication reply signals) generated by the RF enabled device 250. In this regard, the RF enabled device 250 comprises an RF transceiver 208. RFID transceivers are well known in the art, and therefore will not be described herein. However, it should be understood that the RF transceiver 208 receives RF signals including information from the transmitting device, and forwards the same to a logic controller 210 for extracting the information therefrom.

The extracted information can be used to determine the location of the handheld reader 200 within a facility (e.g., RSF 128 of FIG. 1). Accordingly, the logic controller 210 can store the extracted information in memory 204, and execute algorithms using the extracted information. For example, the logic controller 210 can perform correlate tag reads with beacon reads to determine the location of the RFID tags within the facility.

Notably, memory 204 may be a volatile memory and/or a non-volatile memory. For example, the memory 204 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 204 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 222 are stored in memory for execution by the RF enabled device 250 and that cause the RF enabled device 250 to perform any one or more of the methodologies of the present disclosure. The instructions 222 are generally operative to facilitate determinations as to where RFID tags are located within a facility. Other functions of the RF enabled device 250 will become apparent as the discussion progresses.

The handheld reader 200 may also comprise an optional beacon receiver 260. The beacon receiver 260 is generally configured to: receive a command signal from the RF enabled device 250 to obtain unique IDs from beacons; send signals to the beacons (e.g., beacons $106_1, \ldots, 106_M$ of FIG. 1) requesting that unique IDs be transmitted therefrom; and receiving signals transmitted from the beacons; parsing unique IDs from the received signals; and communicating the unique IDs to the RF enabled device 250. The command signal can be generated by and sent from the RF enabled device 250 in response to an operator's depression of a trigger 270.

The handheld reader 200 may further comprise an optional proximity sensor 262 (e.g., an acoustic sensor or infrared sensor). The proximity sensor 262 detects the distance from the handheld reader 200 to the RFID tags being read (e.g., RFID tags $112_1, \ldots, 112_N$, $118_1, \ldots, 118_N$ of FIG. 1). A distance threshold value can be applied to trigger the location mode. The distance can be used to adjust the read power of the handheld reader. The distance can be used to compute more precise tag locations.

Figure 3:
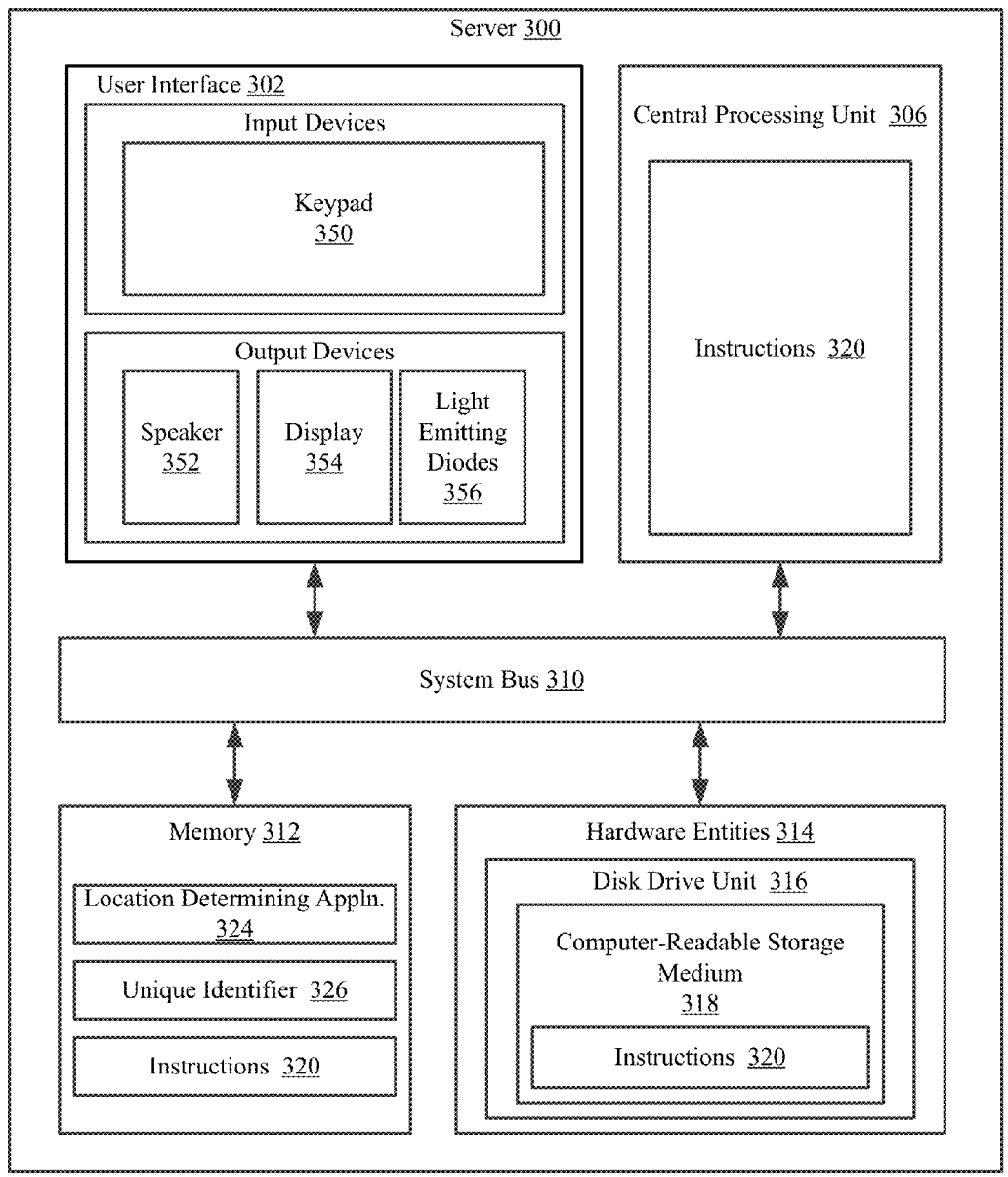
FIG. 3 is a block diagram of an exemplary architecture for a server.

Referring now to FIG. 3, there is provided a detailed block diagram of an exemplary architecture for a server 300. Server 124 of FIG. 1 is the same as or substantially similar to server 300. As such, the following discussion of server 300 is sufficient for understanding server 124.

Notably, the server 300 may include more or less components than those shown in FIG. 3. However, the components shown are sufficient to disclose an illustrative embodiment implementing the present invention. The hardware architecture of FIG. 3 represents one embodiment of a representative server configured to facilitate the provision of a three dimensional map showing locations of RFID tags (e.g., RFID tags $112_1, \ldots, 112_N, 118_1, \ldots, 118_N$ of FIG. 1) within an RSF (e.g., RSF 128 of FIG. 1). As such, the server 300 of FIG. 3 implements at least a portion of a method for providing such tag locations in accordance with embodiments of the present invention. Some or all the components of the server 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the server 300 comprises a user interface 302, a Central Processing Unit ("CPU") 306, a system bus 310, a memory 312 connected to and accessible by other portions of server 300 through system bus 310, and hardware entities 314 connected to system bus 310. The user interface can include input devices (e.g., a keypad 350) and output devices (e.g., speaker 352, a display 354, and/or light emitting diodes 356), which facilitate user-software interactions for controlling operations of the server 300.

At least some of the hardware entities 314 perform actions involving access to and use of memory 312, which can be a Random Access Memory ("RAM"), a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the server 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the server 300 and that cause the server 300 to perform any one or more of the methodologies of the present disclosure.

In some embodiments of the present invention, the hardware entities 314 include an electronic circuit (e.g., a processor) programmed for facilitating the provision of a three dimensional map showing locations of RFID tags within a facility. In this regard, it should be understood that the electronic circuit can access and run a location determining application 324 installed on the server 300. The software application 324 is generally operative to facilitate: the determination of RFID tag locations within a facility; and the mapping of the RFID tag locations in a virtual three dimensional space. Other functions of the software application 324 will become apparent as the discussion progresses.

Exemplary Methods For Locating An RF Enabled-Device In A Facility

Figure 4A:
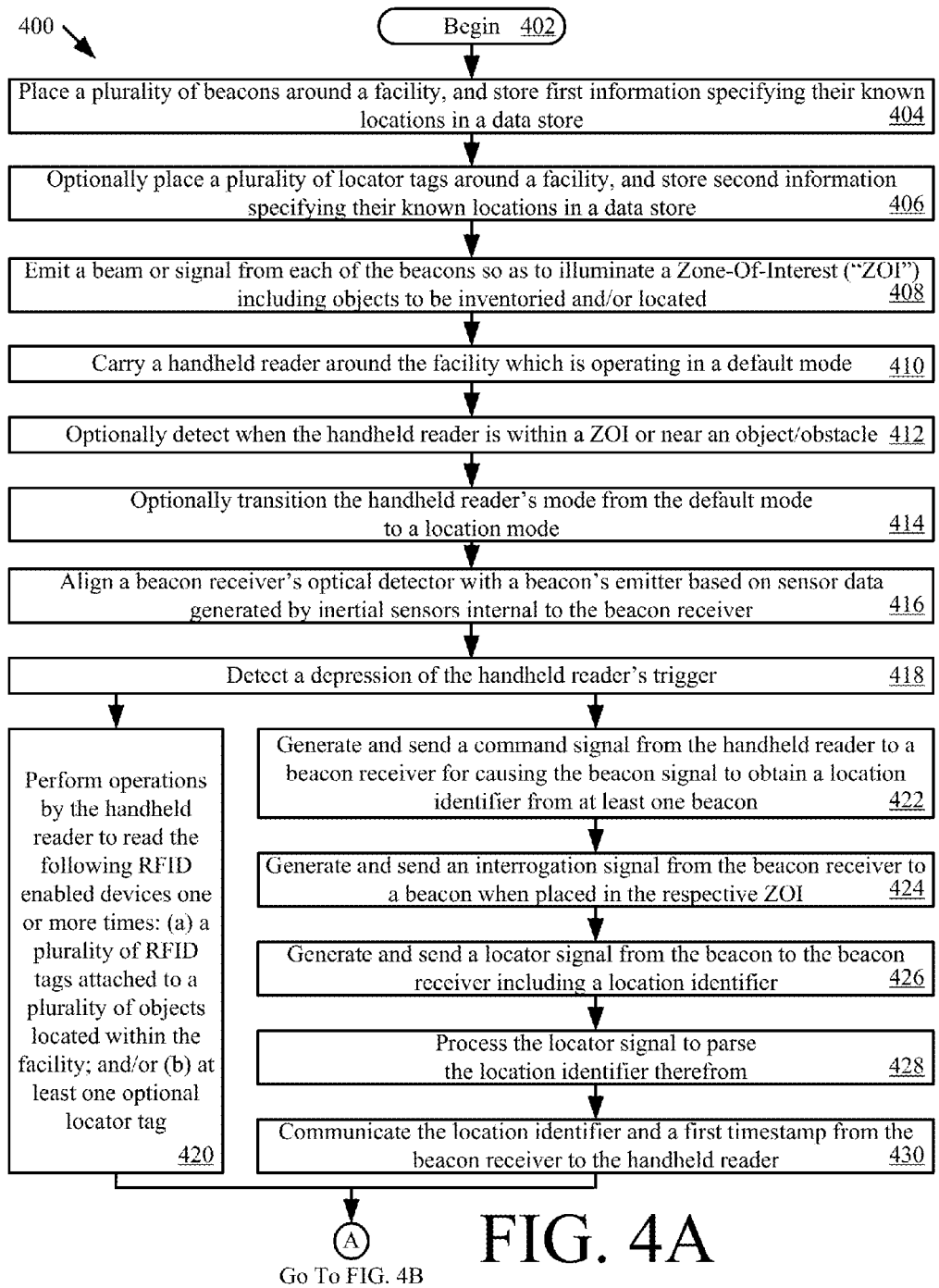
FIGS. 4A-4B (collectively referred to herein as "FIG. 4") provide a flow diagram of an exemplary method for determining a location of a RFID tags within a facility.

Referring now to FIG. 4, there is provided a flow diagram of an exemplary method 400 for locating RFID tags (e.g., RFID tags $112_1, \ldots, 112_N, 118_1, \ldots, 118_N$ of FIG. 1) within a facility (e.g., RSF 128 of FIG. 1). Method 400 begins with step 402 and continues with step 404. In step 404, a plurality of beacons (e.g., beacons $106_1, \ldots, 106_M$ of FIG. 1) are strategically placed around the facility. In some scenarios, the beacons are disposed on ceilings, walls, display equipment (e.g., display equipment $102_1, \ldots, 102_M$ of FIG. 1), emergency equipment, checkout counters and/or EAS system equipment. Notably, each beacon has a known directional emission pattern and location within the facility. First information specifying the beacons' locations with the facility is stored in a data store (e.g., data store 126 of FIG. 1) for later use in an RFID tag locating process. The beacons can be arranged such that their antenna patterns do or do not overlap.

Additionally or alternatively, optional step 406 is performed where a plurality of locator tags are strategically placed around the facility. The locator tags can be disposed on display equipment, such as shelving units. Second information specifying the locator tags' locations within the facility is stored in the data store for later use in an RFID tag locating process.

Next in step 408, a beam or signal is emitted from each of the beacons so as to illuminate a ZOI including objects to be inventoried and/or located. For example, a beam is emitted from a beacon to illuminate a particular shelving unit or other piece of display equipment (e.g., a table).

Upon completing step 408, step 410 is performed where a handheld reader (e.g., handheld reader 120 of FIG. 1) is carried around the facility. At this time, the handheld reader is operating in a default mode, i.e., using a maximum power and reading RFID tags (e.g., RFID tags $112_1, \ldots, 112_N, 118_1, \ldots, 118_N$ of FIG. 1) only once to ensure inventory accuracy in a timely manner.

In some scenarios, the mode of the handheld reader is automatically changed when a detection is made that the handheld reader is in a beacon's ZOI or near and object/obstacle, as shown by optional steps 412 and 414. For example, the handheld reader is transitioned from its default mode to its location mode when a detection is made that the handheld reader is in a beacon's ZOI. In the location mode, the handheld reader toggles between reads at high power and reads at low power to allow location accuracy. In location mode, an RFID tag can be read multiple times to allow the correlation logic to re-allocate an RFID tag from one location to another. The power can be dynamically adjusted depending on the RFID tag density being read. As inventory accuracy has to be maintained, the power applied in location mode can be reduced in case of dense tag population, and vice versa.

A beacon receiver (e.g., beacon receiver 150 of FIG. 1) may be provided as an accessory for the handheld reader or as a separate standalone device worn by an operator of the handheld reader. The beacon receiver is provided for communicating with the beacons disposed around the facility while the handheld reader is reading RFID tags. As such, step 416 is performed where the beacon receiver's optical detector is aligned with a beacon's emitter based on sensor data generated by inertial sensors (e.g., inertial sensors 152 of FIG. 1) located internal to the beacon reader.

After completing step 416, step 418 is performed where a detection is made. More particularly, depression of a trigger (e.g., trigger 270 of FIG. 2) is detected by the handheld reader. The trigger is depressed by an operator when (s)he wants the handheld reader to read RFID tags. In response to this detection, method 400 continues with step 420 and steps 422-430, which are performed concurrently. Step 420 involves performing operations by the handheld reader to read the following RFID enabled devices one or more times: (a) a plurality of RFID tags attached to a plurality of objects (e.g., objects $110_1, \ldots, 110_N$, $116_1, \ldots, 116_N$ of FIG. 1) located within the facility; and/or (b) at least one optional locator tag.

While step 420 is being performed, steps 422-430 are performed. These steps involve: generating and sending a command signal from the handheld reader to a beacon receiver for causing the beacon signal to obtain a location identifier from at least one beacon; generating and sending an interrogation signal from the beacon receiver to a beacon when placed in the respective ZOI; generating and sending a locator signal from the beacon to the beacon receiver including a location identifier; processing the locator signal to parse the location identifier therefrom; and communicating the location identifier and a first timestamp from the beacon receiver to the handheld receiver.

Figure 4B:
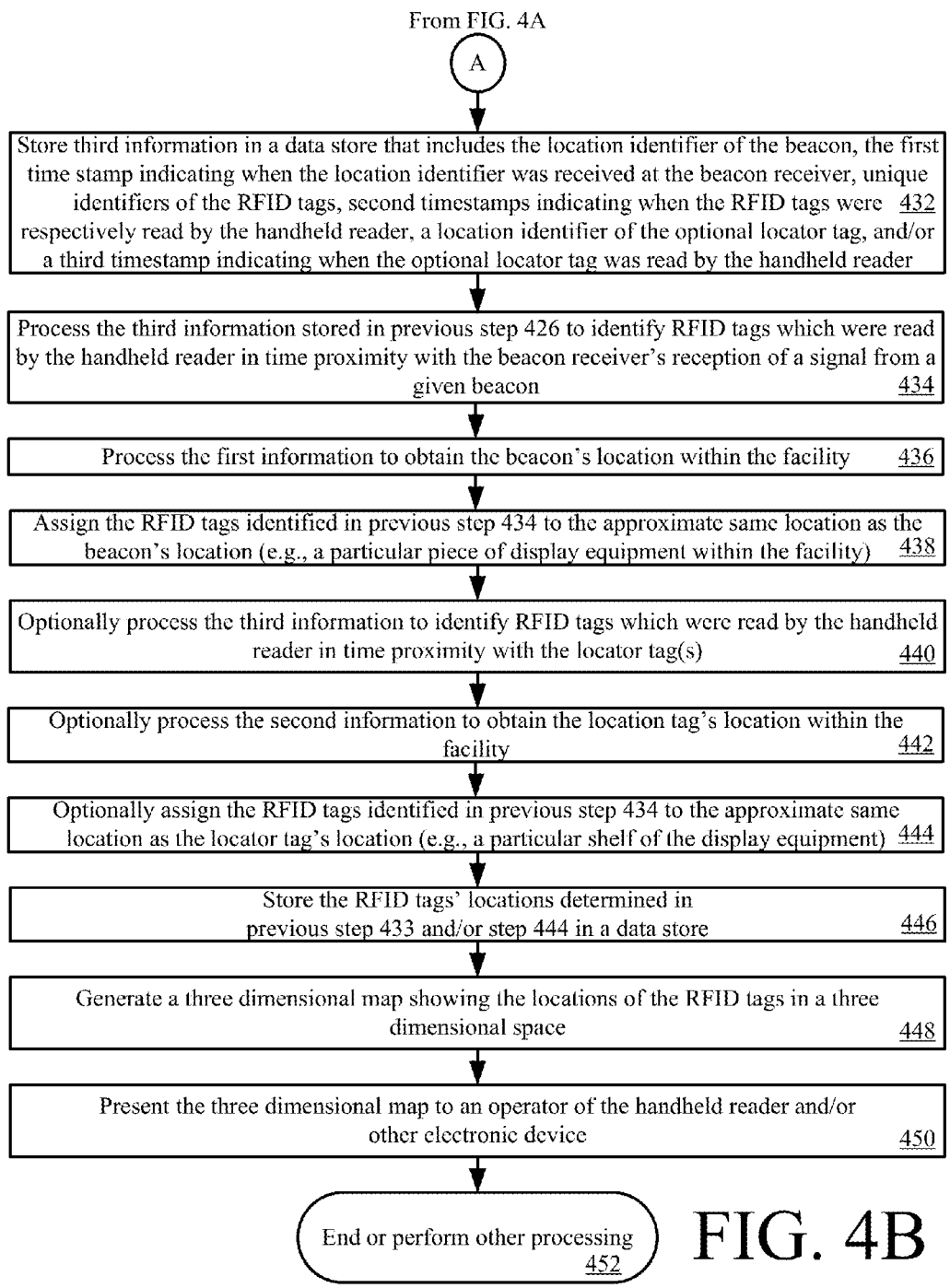

Upon completing steps 420 and 430, the method 400 continues with step 432 of FIG. 4B. In step 432, third information is stored in the data store. The third information includes the location identifier of the beacon, the first time stamp indicating when the location identifier was received at the beacon receiver, unique identifiers of the RFID tags, second timestamps indicating when the RFID tags were respectively read by the handheld reader, a location identifier of the optional locator tag, and/or a third timestamp indicating when the optional locator tag was read by the handheld reader. The third information is then processed in step 434 to identify RFID tags which were read by the handheld reader in time proximity with the beacon receiver's reception of a signal from a given beacon.

The first information is also processed in step 436 to obtain the beacon's location within the facility. The RFID tags (identified in previous step 434) are assigned to the approximate same location as the beacon's location (e.g., a particular piece of display equipment within the facility), as shown by step 438.

In some scenarios, optional steps 440-444 are performed. These steps involve: processing the third information to identify RFID tags which were read by the handheld reader in time proximity with the locator tag(s); processing the second information to obtain the location tag's location within the facility; and/or assigning the RFID tags (identified in previous step 434) to the approximate same location as the locator tag's location (e.g., a particular shelf of a shelving unit).

The RFID tags' locations are then stored in the data store, as shown by step 446. A three dimensional map is generated in step 448 which shows the locations of the RFID tags in a three dimensional space. The location of the handheld reader, beacons, locator tags, and/or beacon receiver may also be shown in the three dimensional map. The three dimensional map is then presented to an operator of the handheld reader and/or other electronic device, as shown by step 450. Subsequently, step 452 is performed where method 400 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for determining a location of an object within a facility, comprising:
    performing operations by a plurality of beacons to respectively illuminate a plurality of Zone-Of-Interests ("ZOIs") including objects to be inventoried or located within the facility;
    performing operations by a handheld reader to read a plurality of RFID tags coupled to the objects located within at least one of the plurality of ZOIs;
    performing operations by a beacon receiver to obtain a first location identifier transmitted from a first beacon of the plurality of beacons while the handheld reader is reading the plurality of RFID tags;
    using the first location identifier to determine approximate locations of the plurality of RFID tags which were read in time proximity to the beacon receiver's reception of the location identifier;
    automatically adapting at least one parameter of the handheld reader based on whether the handheld reader is present within a ZOI of the plurality of ZOIs, near an object, or near an obstacle; and
    performing operations by the handheld reader to read the plurality of RFID tags once again subsequent to the parameter's adaption.

2. The method according to claim 1, further comprising aligning the beacon receiver's detector with a beacon's emitter based on sensor data generated by inertial sensors located internal to the beacon receiver.

3. The method according to claim 1, further comprising:
    detecting depression of a trigger of the handheld reader being carried through the facility by an operator; and
    in response to the depression of the trigger, performing operations by the handheld reader to cause the beacon receiver to communicate with at least the first beacon of the plurality of beacons.

4. The method according to claim 1, further comprising:
    performing operations by the handheld reader to read locator tags while reading the plurality of RFID tags; and
    assigning the locator tag's known location to each of the plurality of RFID tags.

5. The method according to claim 1, further comprising generating a three dimensional map showing locations of the RFID tags.

6. The method according to claim 1, wherein the beacon receiver is an accessory of the handheld receiver or a standalone device worn by an operator of the handheld device.

7. The method according to claim 1, wherein the beacon receiver communicates the first location identifier to the handheld receiver via a wireless short range communication.

8. The method according to claim 1, further comprising:
performing operations by the beacon receiver to obtain a second location identifier transmitted from a second beacon of the plurality of beacons while the handheld reader is reading the plurality of RFID tags;
computing a location confidence value for each of the first and second location identifiers and for each of the plurality of RFID tags; and
deducing the approximate locations of the plurality of RFID tags based on the location confidence values.

9. A method for determining a location of an object within a facility, comprising:
performing operations by a plurality of beacons to respectively illuminate a plurality of Zone-Of-Interests ("ZOIs") including objects to be inventoried or located within the facility;
performing operations by a handheld reader to read a plurality of RFID tags coupled to the objects located within at least one of the plurality of ZOIs;
performing operations by a beacon receiver to obtain a first location identifier transmitted from a first beacon of the plurality of beacons while the handheld reader is reading the plurality of RFID tags;
using the first location identifier to determine approximate locations of the plurality of RFID tags which were read in time proximity to the beacon receiver's reception of the location identifier;
detecting when the handheld reader is within a ZOI of the plurality of ZOIs, near an object, or near an obstacle; and
automatically transitioning a mode of the handheld reader from a default mode in which the handheld reader performs tag reads at high power to a location mode in which the handheld reader toggles between tag reads at high power and tag reads at low power.

10. A method for determining a location of an object within a facility, comprising:
performing operations by a plurality of beacons to respectively illuminate a plurality of Zone-Of-Interests ("ZOIs") including objects to be inventoried or located within the facility;
performing operations by a handheld reader to read a plurality of RFID tags coupled to the objects located within at least one of the plurality of ZOIs;
performing operations by a beacon receiver to obtain a first location identifier transmitted from a first beacon of the plurality of beacons while the handheld reader is reading the plurality of RFID tags;
using the first location identifier to determine approximate locations of the plurality of RFID tags which were read in time proximity to the beacon receiver's reception of the location identifier; and
adjusting a power level of the handheld reader based on a density of RFID tags being read.

11. A system, comprising:
a plurality of beacons respectively illuminating a plurality of Zone-Of-Interests ("ZOIs") including objects to be inventoried or located within a facility;
a handheld reader configured to read a plurality of RFID tags coupled to the objects located within at least one of the plurality of ZOIs, and to automatically adapt at least one operational parameter based on whether the handheld reader is present with a ZOI of the plurality of ZOIs, near an object or near an obstacle;
a beacon receiver configured to obtain a first location identifier transmitted from a first beacon of the plurality of beacons while the handheld reader is reading the plurality of RFID tags; and
an electronic circuit configured to use the first location identifier to determine approximate locations of the plurality of RFID tags which were read in time proximity to the beacon receiver's reception of the location identifier.

12. The system according to claim 11, wherein the beacon receiver's detector is aligned with a beacon's emitter based on sensor data generated by inertial sensors located internal to the beacon receiver.

13. The system according to claim 11, wherein the handheld reader performs operations to cause the beacon receiver to communicate with at least the first beacon of the plurality of beacons, in response to a depression of a trigger of the handheld reader.

14. The system according to claim 11, wherein the handheld reader further performs operations to read locator tags while reading the plurality of RFID tags, and the locator tag's known location is assigned to each of the plurality of RFID tags.

15. The system according to claim 11, wherein the electronic circuit is further configured to generate a three dimensional map showing locations of the RFID tags.

16. The system according to claim 11, wherein the beacon receiver is an accessory of the handheld receiver or a standalone device worn by an operator of the handheld device.

17. The system according to claim 11, wherein the beacon receiver communicates the first location identifier to the handheld receiver via a wireless short range communication.

18. The system according to claim 11, wherein
the beacon receiver performs operations to obtain a second location identifier transmitted from a second beacon of the plurality of beacons while the handheld reader is reading the plurality of RFID tags, and
the electronic circuit computes a location confidence value for each of the first and second location identifiers and for each of the plurality of RFID tags, and
the approximate locations of the plurality of RFID tags are deduced based on the location confidence values.

19. A system, comprising:
a plurality of beacons respectively illuminating a plurality of Zone-Of-Interests ("ZOIs") including objects to be inventoried or located within a facility;
a handheld reader configured to read a plurality of RFID tags coupled to the objects located within at least one of the plurality of ZOIs;
a beacon receiver configured to obtain a first location identifier transmitted from a first beacon of the plurality of beacons while the handheld reader is reading the plurality of RFID tags; and
an electronic circuit configured to use the first location identifier to determine approximate locations of the plurality of RFID tags which were read in time proximity to the beacon receiver's reception of the location identifier;
wherein a mode of the handheld reader is automatically transitioned from a default mode in which the handheld reader performs tag reads at high power to a location mode in which the handheld reader toggles between tag reads at high power and tag reads at low power, in response to a detection that the handheld reader is within a ZOI of the plurality of ZOIs, near an object, or near an obstacle.

20. A system, comprising:
- a plurality of beacons respectively illuminating a plurality of Zone-Of-Interests ("ZOIs") including objects to be inventoried or located within a facility;
- a handheld reader configured to read a plurality of RFID tags coupled to the objects located within at least one of the plurality of ZOIs;
- a beacon receiver configured to obtain a first location identifier transmitted from a first beacon of the plurality of beacons while the handheld reader is reading the plurality of RFID tags; and
- an electronic circuit configured to use the first location identifier to determine approximate locations of the plurality of RFID tags which were read in time proximity to the beacon receiver's reception of the location identifier;
- wherein a power level of the handheld reader is automatically adjusted based on a density of RFID tags being read.

* * * * *